United States Patent
Young

(10) Patent No.: US 9,605,439 B2
(45) Date of Patent: Mar. 28, 2017

(54) KITCHEN CABINET INSTALLATION DEVICE

(71) Applicant: Ronald Young, Innisfil (CA)

(72) Inventor: Ronald Young, Innisfil (CA)

( * ) Notice: Subject to any disclaimer, the term of this patent is extended or adjusted under 35 U.S.C. 154(b) by 28 days.

(21) Appl. No.: 14/810,024

(22) Filed: Jul. 27, 2015

(65) Prior Publication Data

US 2017/0030092 A1 Feb. 2, 2017

(51) Int. Cl.
| | | |
|---|---|---|
| *B66F 7/00* | (2006.01) | |
| *E04F 21/00* | (2006.01) | |
| *A47B 77/00* | (2006.01) | |
| *F16M 11/38* | (2006.01) | |
| *F16M 11/18* | (2006.01) | |
| *E04G 21/16* | (2006.01) | |
| *E04G 21/18* | (2006.01) | |
| *B66F 3/22* | (2006.01) | |

(52) U.S. Cl.
CPC .............. *E04F 21/00* (2013.01); *A47B 77/00* (2013.01); *B66F 3/22* (2013.01); *E04G 21/163* (2013.01); *E04G 21/1841* (2013.01); *F16M 11/18* (2013.01); *F16M 11/38* (2013.01)

(58) Field of Classification Search
CPC .............. B66F 7/00; B66F 7/065; B66F 7/14
See application file for complete search history.

(56) References Cited

U.S. PATENT DOCUMENTS

| | | | | |
|---|---|---|---|---|
| 4,405,116 A | * | 9/1983 | Eisenberg | B66F 7/0608 182/141 |
| 6,238,159 B1 | | 5/2001 | Pappas | |
| 7,111,825 B2 | * | 9/2006 | Landsberger | B66F 3/12 254/122 |
| 8,567,763 B1 | * | 10/2013 | Nolan | B66F 3/12 254/122 |
| 2012/0313059 A1 | * | 12/2012 | Litcher | B66F 3/22 254/122 |

* cited by examiner

*Primary Examiner* — Lee D Wilson
(74) *Attorney, Agent, or Firm* — Nasser Ashgriz; UIPatent Inc.

(57) ABSTRACT

A kitchen cabinet installation device to install upper wall cabinets and suspended cabinets is provided. The kitchen cabinet installation device of the present invention is a lightweight box for easy transportation and to provide an easy and quick installation procedure with precision and make the installation procedure a one man job. The kitchen cabinet installation device includes a box having a base and a cap, and a double scissor jack installed into the box. The box features rails with rollers to provide a smooth movement of the jack. The jack includes a lead screw. By cabinet installation the object is placed on the cap and is lifted by turning the knob in lead screw and held during the installation in a secure position.

7 Claims, 8 Drawing Sheets

KITCHEN CABINET INSTALLATION DEVICE

FIELD OF THE INVENTION

The present invention relates generally to a cabinet installation device and more particularly to a lifting and supporting device for mounting upper wall cabinets at a designated height.

BACKGROUND OF THE INVENTION

Cabinet installation procedure usually requires more than one person. In order to secure the cabinets in the kitchen, in view of the size of the cabinets, a standard of two installers are involved to complete the installation. One installer holds the cabinet in the designated place, while the other installer secures the cabinet to the wall. In addition, the cabinets can be very heavy, which again may require two people to lift and align them to a desired vertical position.

The prior art discloses various devices to make cabinet installation easier, less time consuming and allow for a more accurate alignment. For example, various jack type devices have been suggested to lift the cabinet to a desired installation level. However, the prior art devices have several drawbacks. Many of them are very bulky and difficult to use. Therefore, installer is not able to easily carry them around and they are not very portable. Some of the prior art devices are portable but they are not proper for precise lifting and alignment. Cabinet installation requires precision for ultimate look and luxury. Only, a few millimeter misalignments may destroy the look of a valuable cabinet. The prior art devices are also prone to slippage and tilting of the cabinet during the installation. Another drawback of the prior art devices is that they do not become compact enough to fit in the limited spaces between the base cabinets and upper wall cabinets or corners.

Therefore, there is a need for a cabinet installation device that is portable and compact to be easily transported by the installer; able to operate in any size of work environment, and strong enough to lift and hold a cabinet securely during the installation process.

SUMMARY OF THE INVENTION

A cabinet installation device comprising of a rectangular shaped box having a base part and top cap and a lifting jack system mounted into the box so that the bottom end of the lifting jack system is secured to an inner area of the base part and a top end of the lifting jack system is secured to an inner area of the top cap.

The lifting jack system comprises of two sets of scissor columns spaced apart and parallel to each other, each scissor column comprises of movable arms with the ends of each arm of each set pivotally connected to the end of an arm in an adjacent set. Plurality of cross elements are used to assure that both sets of scissor columns remain in parallel relationship, vertically and horizontally, as the scissor mechanism is extended and retracted. One of the two end arms of each scissor columns is screwed and secured to both longitudinal edges of inner side of the support base and the opposite end arm of each scissor set is screwed and secured to the inner side of the top cap of the box. The jack system is designed for simultaneous operation for raising and holding the kitchen cabinets. The scissor columns are connected to each other by rod mechanism for raising and lowering the two jack columns.

The box comprises of a base part and a top cap. The top cap having the same dimension as the base part with a lower depth, and an inner edge to fit on the base part. The top cap acts as a support plate for lifting and holding the objects such as kitchen cabinets. Both the bottom base and the top cap have smooth bottom and top surfaces, respectively, to prevent any damage to the counter tops or cabinets.

A pair of 3 channel rolling tracks is provided to the inner side of the base. Said 3 channel rolling tracks are mounted on the longitudinal sidewalls of the base part and extend from one edge to its middle portion. The open sides of the channels face each other. A pair of C shape rails is also provided to the inner side of the top cap. Said rails are mounted on the longitudinal sides of a rectangular device. Said device is secured to the inner side of the cap with a distance from the side walls. The open channel of the rails face to the side walls.

A scissor jack is a requirement for the needed precision in this application. The scissor jack comprises of a pair of double X-shaped scissor columns disposed vertically parallel to each other. Each scissor column comprises of a first arm and a second arm, which are rotatably joined to each other at their mid-portion and form an X-shaped structure, and a third arm and a fourth arm which are also rotatably joined to each other at their mid-portions and form an X-shaped structure. The lower ends of the third and fourth arm are rotatably connected to the upper ends of the first and second arms respectively, whereby a double X-shaped structure is formed.

The first arm in each scissor column has a lower end fastened by a bracket to the inner part of the base oppose to the channels. The second arm of each scissor column has a lower end connecting pivotally to a shaft. The shaft is fitted from each end into the 3 channel rolling tracks of the base to provide a smooth and slidable movement of the arms along the channels, thereby causing the jack component to expand and contract.

A cap, which is used for lifting and holding an object like kitchen cabinet, is horizontally supported on the upper ends of the jack. The upper ends of the third arms is fastened by a bracket to the inner part of the top cap oppose to the C shape rails. A roller bearing is attached to the end of the fourth arm of each scissor column. Said fourth arms are slidably mounted in each rail of the cap, to provide a smooth movement.

Plurality connecting rods connect two scissor columns in a manner that the arms can pivotally move, thereby causing the jack component to expand and contract. The first connecting rod extend horizontally from the middle of the first and the second arm and the second and third rod connect two ends of the third and fourth arm and the fourth rod connect the middle of the third and fourth arm and thereby the two scissor column connect together.

The installation device is further comprised of a horizontally extending, rotatable lead screw. The rotatable lead screw is provided on its outer edge with threads that extend from one end of the lead screw and across approximately two-thirds to three-fourth of the length of the lead screw and a turning knob situated on the end of the unthreaded portion of the rotatable lead screw. The turning knob is of a micro fine turning knob to precise height adjustment. The lead screw can be turned using bare hand or drill. The connection rods which receive the lead screw are shafts having a bore at the middle of each, so that the lead screw will advance simultaneously through the connection rods. Each of the shafts is provided with a bore. In the case of the shaft on the turning knob side, the bore provided there through is unthreaded. In the case of the shaft on the threaded side of the lead screw, the provided bore is threaded.

When the jack is in an assembled position the threaded portion of the lead screw is rotatable received by the threaded bore in the shaft and the unthreaded portion of the screw is rotatably received by the bore in shaft.

The present installation device is equipped with a level on the cap to provide a thoroughgoing installation. The installation device is also provided with a height scale indicator in the inner base part of the box.

By turning the turning knob, the jack assembly raises to the desired height. The roller bearing mechanism provided in upper and lower channels creates a smooth glide of the arms in an effortless lift and lower action.

In its collapsed position, the jack is 40-45 cm in length, 25-30 cm in width at the widest point and less than 20 cm in height, so that it can fit in a box of about the same size. The jack's height starts from 12.7 cm and reaches an optimal height of 64 cm in the most expandable height. The base and cap parts of the present installation device are made of high density polyethylene giving it a sleek look yet making it almost indestructible. Their smooth top and bottom surfaces prevent any damage to counter tops and cabinets. The inner components are constructed of aluminum therefore conforming to its lightweight to be easily transported.

It is an objective of the present invention to perform a smooth and easy movement of the device by providing channels in the upper and lower structures of the device.

It is another object of the present invention to provide elements which simplify the installation process, eliminate the need for second and third person and make the installation a one-man job.

It is another object of the present invention to provide a portable cabinet installation device that has the ability of lifting the cabinets up to 150 pounds and holding them in a secure manner without any movement. This enables the installer to work with both hands.

It is another object of the present invention to provide an easy and comfortable micro turning knob for precise height adjustment.

It is another object of the present invention to provide a level on the top cap and a height scale indicator inside the base bottom of the installation device for proper alignment.

According to the size of the present invention it is an ideal device for special needs cabinets and handicapped kitchens due to its low profile under lower base cabinets and ideal for cabinet installation in slight places.

Other objects, features, and advantages of the present invention will be readily appreciated from the following description. The description makes reference to the accompanying drawings, which are provided for illustration of the preferred embodiment. However, such embodiments do not represent the full scope of the invention.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figure 1:
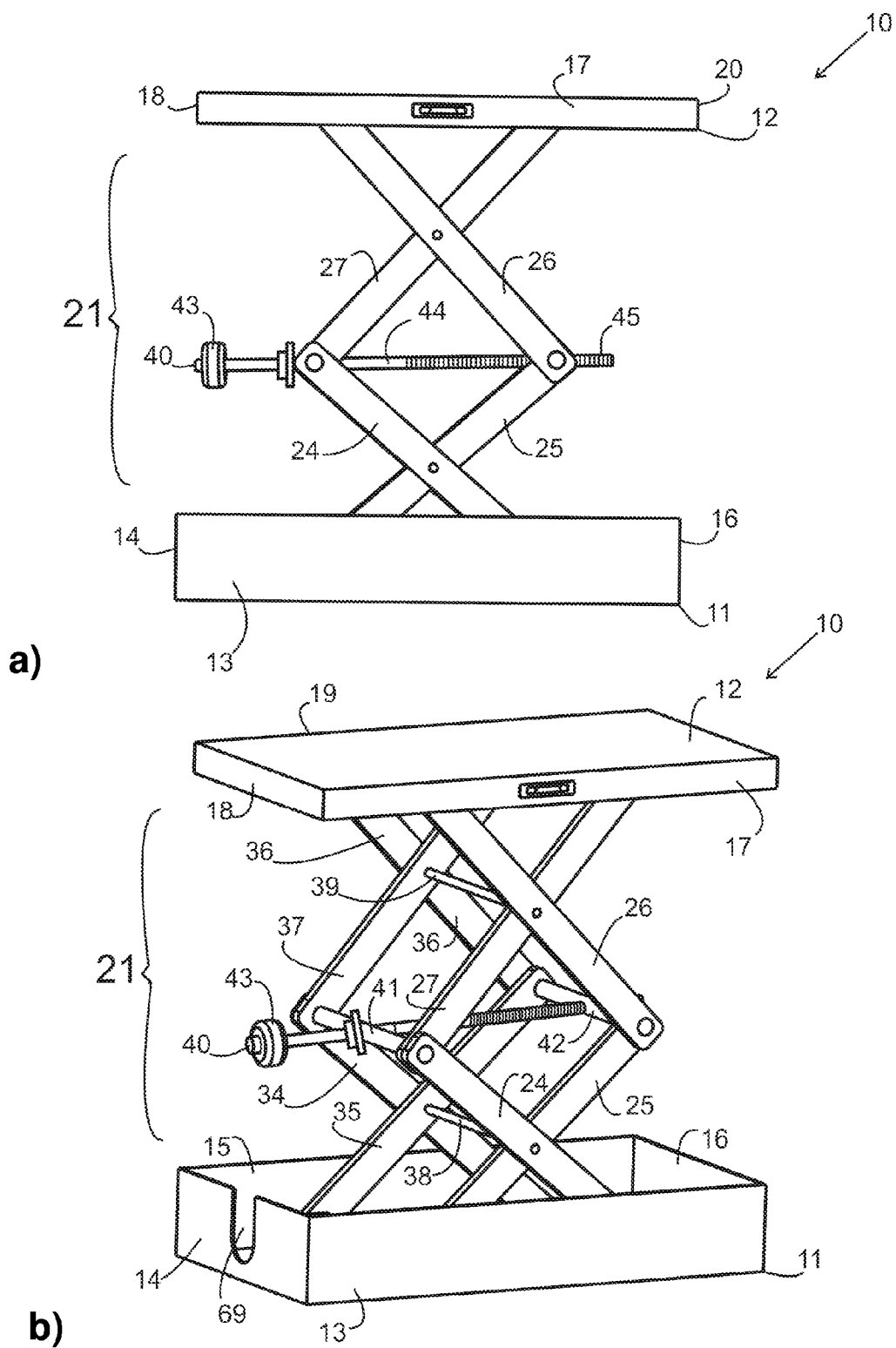
FIG. 1(a) is a front perspective view of the cabinet installation device according to the present invention.
FIG. 1(b) is a perspective view of the cabinet installation device according to the present invention.

A cabinet installation device 10 according to the present invention is shown in FIGS. 1(a) and 1(b), comprising of a rectangular shaped box having a base part 11 and top cap 12. The base part have a dimensions of 17 inches in length, 9¾ inches in width and a 3¾ in depth. The base part 11 including opposing sidewalls 13, 15 and 14,16 fixedly attached. The top cap further having a dimensions of 17 inches in length, 9¾ inches in width and 2 inches in depth. The cap 12 including opposing sidewalls shown by the numeral 17, 19 and 18, 20. A scissor jack 21 mounted into the box so that the bottom end of the scissor jack is secured to the base part 11 of the box and the top end of the jack is attached underneath the top cap 12 of the box. The box is constructed of H.D.P.E (polyethylene with high density) and the jack is made if aluminum to enhance a lightweight to be easily transported.

Figure 2:
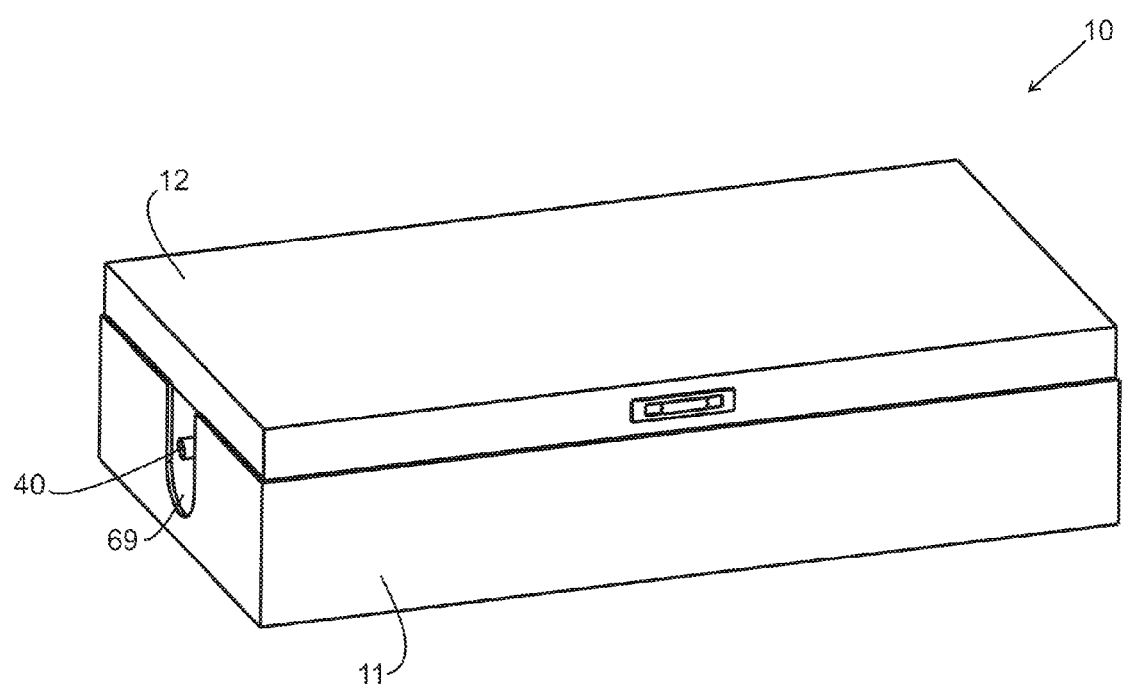
FIG. 2 is a top view of the present invention in collapsed position.

FIG. 2 shows the installation device 10 in collapsed position which is a rectangular box having dimensions of about 17 inches in length, 10 inches in width and about 5 inches in depth. The scissor assembly fits in the box shape by said base part 11 and said top cap 12 to enhance the transportation.

According to FIGS. 1(a) and 1(b) again the installation device system 10 consists of a scissor jack 21 comprising of two sets of scissor columns spaced apart and parallel to each other, each scissor column comprises of movable arms 24,25,26,27 and 34,35,36,37. Each scissor column comprises of a pair of double X-shaped jack components disposed vertically parallel to each other and building a set of lifting jack 21. Each scissor column comprises of a first arm 24, 34 and a second arm 25, 35. A first arm 24 and a second arm 25 of the first scissor column are rotatably joined to each other at their mid-portion and form an X-shaped structure. A first arm 34 and a second arm 35 of the second scissor column are rotatably joined to each other at their mid-portion and form an X-shaped structure. A third arm 26 and a fourth arm 27 of the first scissor column, and a third arm 36 and a fourth arm 37 of the second scissor column are also rotatably joined to each other at their mid-portions and form an X-shaped structure. The lower ends of the third and fourth arm 26, 27 are rotatably connected to the upper ends of the first and second arms 24, 25, so that lower end of third arm 26 is pivotally connected to the upper end of second arm 25 in first scissor column and lower end of third arm 36 is connected pivotally to the upper end of the second arm 35 in second scissor column respectively, whereby a double X-shaped structure 21 is formed. As shown in FIG. 1(b), base part further having an opening 69 for access to the turning knob 43 on the side wall 14 of the base 11.

According to FIGS. 1(a) and 1(b) again Plurality connecting rods 38, 39, 41, 42 horizontally connect two scissor columns in a manner that the arms can pivotally move, thereby cause the jack assembly 21 to expand and contract. A connecting rod 38 extend horizontally from the middle of first arm 24 and second arm 25 of the first scissor column to the middle of first arm 34 and second arm 35 of the second scissor column. Another connecting rod 39 connect the middle of the third arm and fourth arm 26, 27 of the first scissor column to the middle of third and fourth arm 36, 37 of the second scissor column. Thereby the two scissor sets connect together.

According to FIGS. 1(*a*) and 1(*b*) again, the jack assembly 21 comprises of a horizontally extending, rotatable lead screw 40, having a turning Knob 43. The lead screw 40 is rotatable connected to a pair of shafts 41, 42.

Figure 3:
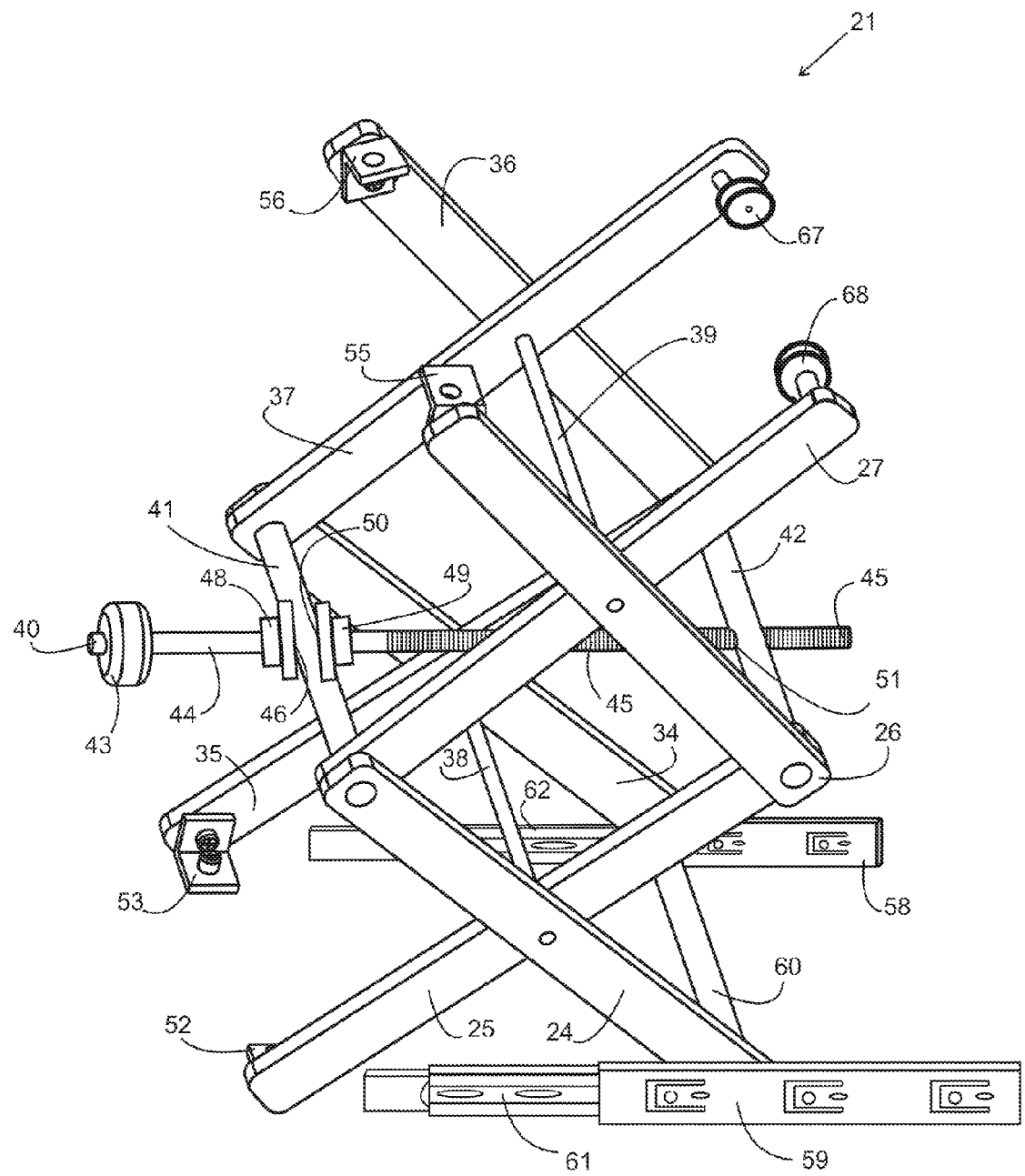
FIG. 3 is a schematic perspective view of the present invention.

According to FIG. 3 The lead screw 40 of the jack assembly 21 is connected to a pair of shafts 41, 42 each having a bore in the middle 46, 51. The unthreaded portion 44 of the lead screw 40 is received by the unthreaded bore 46 of the shaft on the turning knob side 41. The threaded portion 45 of the lead screw 40 is received by the threaded bore 51 of the opposite side shaft 42. When the jack assembly 21 is in an assembled position the threaded portion 45 of the lead screw 40 is rotatably received by the threaded bore 51 in the second shaft 42 and the unthreaded portion 44 of the screw 40 rotates in unthreaded bore 46 in the first shaft 41.

According to FIG. 1(*b*) and FIG. 3 the first shaft 41 connect both the lower end of the fourth arms 27, 37 and the top part of the first arms 24,34 of the jack sets. The second shaft 42 connect both the lower end of the third arms 26, 36 and the top part of the second arms 25,35 of the jack sets. Both shafts 41, 42 are parallel to each other. The rotatable lead screw 40 is perpendicularly extends from the middle of the first shaft 41 through the middle of the second shaft 42. The lead screw is provided on its outer edge with threads. Threads can be a double lead Acme thread that are well known in scissor jacks and traditionally has proven to be advantageous where heavy objects need to be raised quickly. The threads have a pitch of 10 or more threads per inch, to ease and comfortable micro height adjustment, that extends from one end of the lead screw 40 and across approximately two-thirds to three-fourth of the length of the lead screw 40. Said lead screw 40 further have a micro turning knob 43 on one end situated on unthreaded portion 44 of the rotatable Lead screw 40.

According to FIG. 3 again the lead screw 40 is joined by the first shaft 41, and the unthreaded portion 44 of the lead screw 40 passes through the unthreaded bore 46.

The lead screw 40 comprises of a micro knob 43, a first washer 48 and a second washer 49. Said micro knob 43 is provided at the end of the unthreaded portion 44 of the lead screw 40. A first washer 48 is situated immediately beside the unthreaded bore 46 and fit in the space, where the lead screw 40 is joined by the shaft 41. A second washer 49 is provided to the other end of the unthreaded bore 50.

According to FIGS. 1(*a*) and 1(*b*) and FIG. 3 the threaded portion 45 of the lead screw 40 extend through the threaded bore 51 of the second shaft 42.

The connecting rods 38, 39 and the shafts 41, 42 assure that scissor columns remain in parallel relationship as the scissor jack 21 is extended and retracted.

As show in FIG. 3 a pair of brackets 52, 53 is mounted to the bottom end of each second arm 25, 35 to fasten and secure the jack assembly 21 to the base 11, and a pair of brackets 55, 56 is mounted to the top end of each third arm 26, 36 to fasten and secure the jack assembly 21 to the top cap 12. The shaft member 60 connects two first arms 24 and 34 together and engages to the roller track 61 of the 3 channel roller track 59 in one end. The shaft member 60 engages on its oppose end to the roller track 62 of the 3 channel roller track 58. Each end part of the fourth arms 27, 37 having a roller bearing 67, 68 facing each other.

Figure 4:
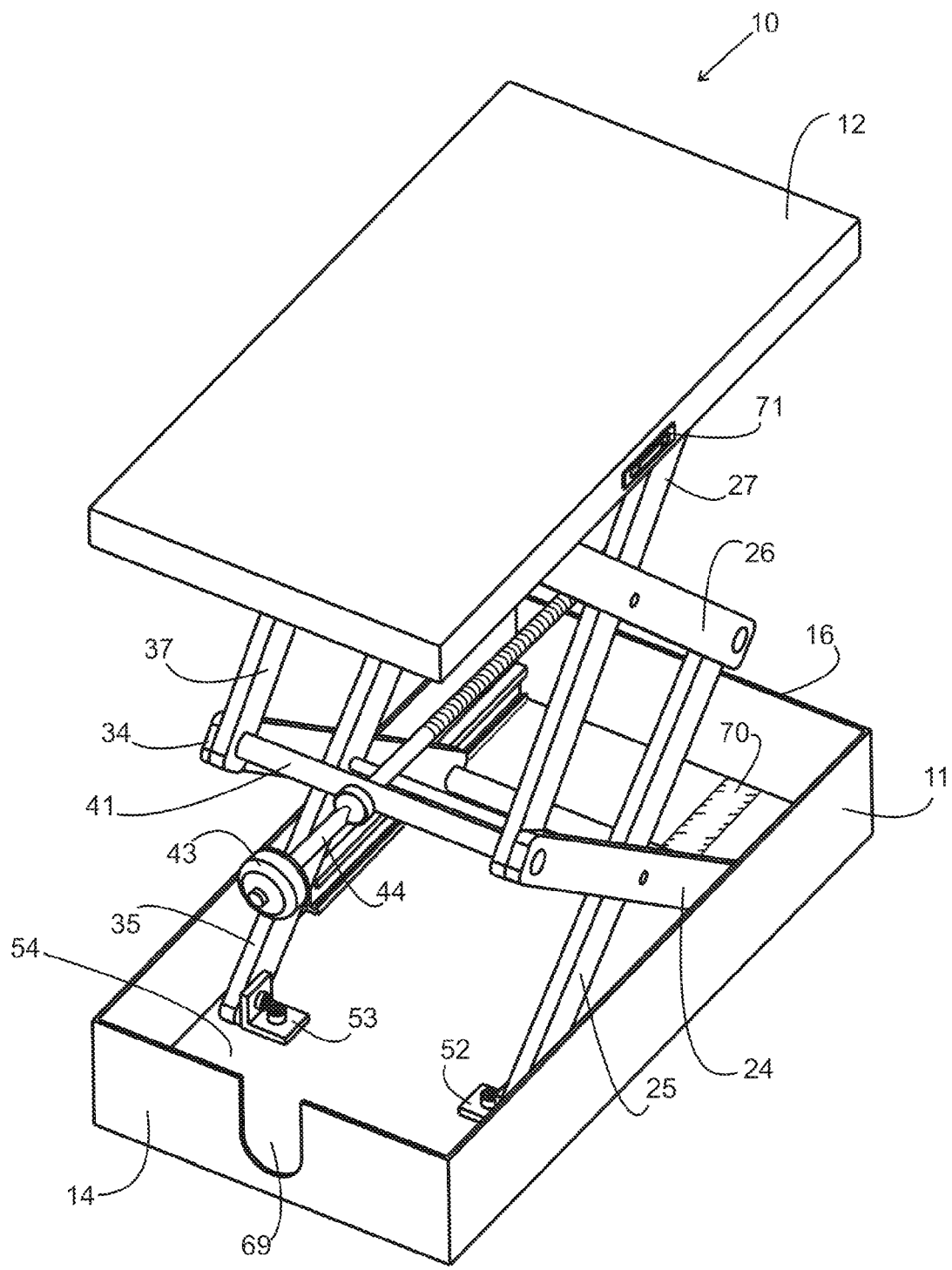
FIG. 4 is a perspective top view of the present invention.
Figure 5:
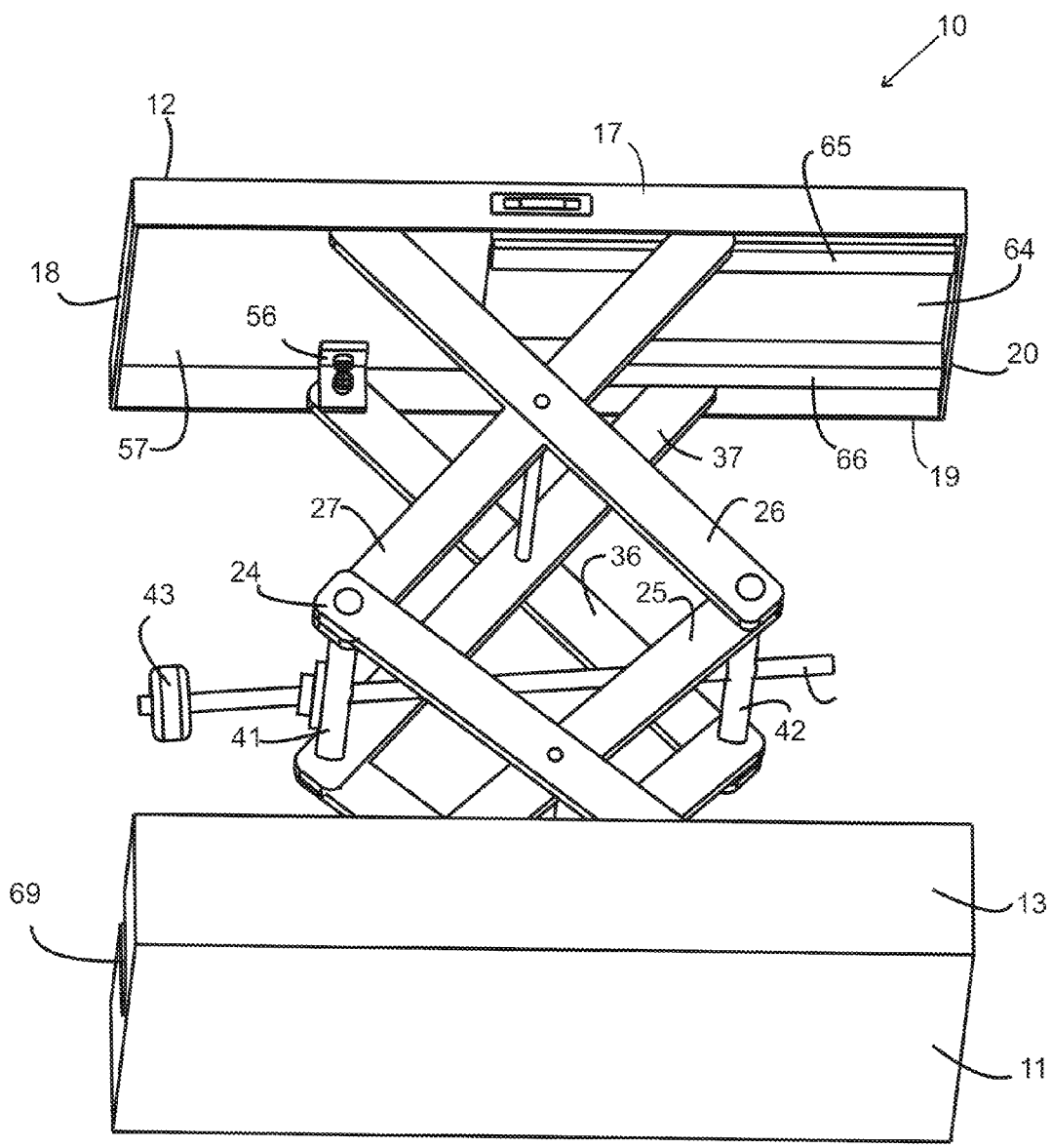
FIG. 5 is a perspective view of the present invention.

According to FIG. 4 and FIG. 5, one end of each scissor column is screwed and secured to the base part 11 of the box and the opposite end is screwed and secured to the cap part 12 of the box.

As shown in FIG. 4 one end part of the second arm 25 in first scissor set is fastened by a bracket 52 to the inner surface of the base part 54. The end part of the second arm 35 of second scissor column is fastened by a second bracket 53 to the inner surface of the base 54. Both arms are screwed to the both longitudinal edges of inner side of the base, parallel to each other and close to the side wall 14.

As shown in FIG. 5 the end part of the third arm 26 in first scissor column is fastened by a bracket to the inner surface 57 of the top cap 12. The end part of the third arm 36 of second scissor column is fastened by a second bracket 56 to the inner surface 57 of the cap 12. Both arms are screwed to the both longitudinal edges of inner side of the cap 12 parallel to each other and close to the side wall 18. The roller bearings connected to the end of each fourth arm 27 and 37 are received by the rails 65, 66.

Figure 6:
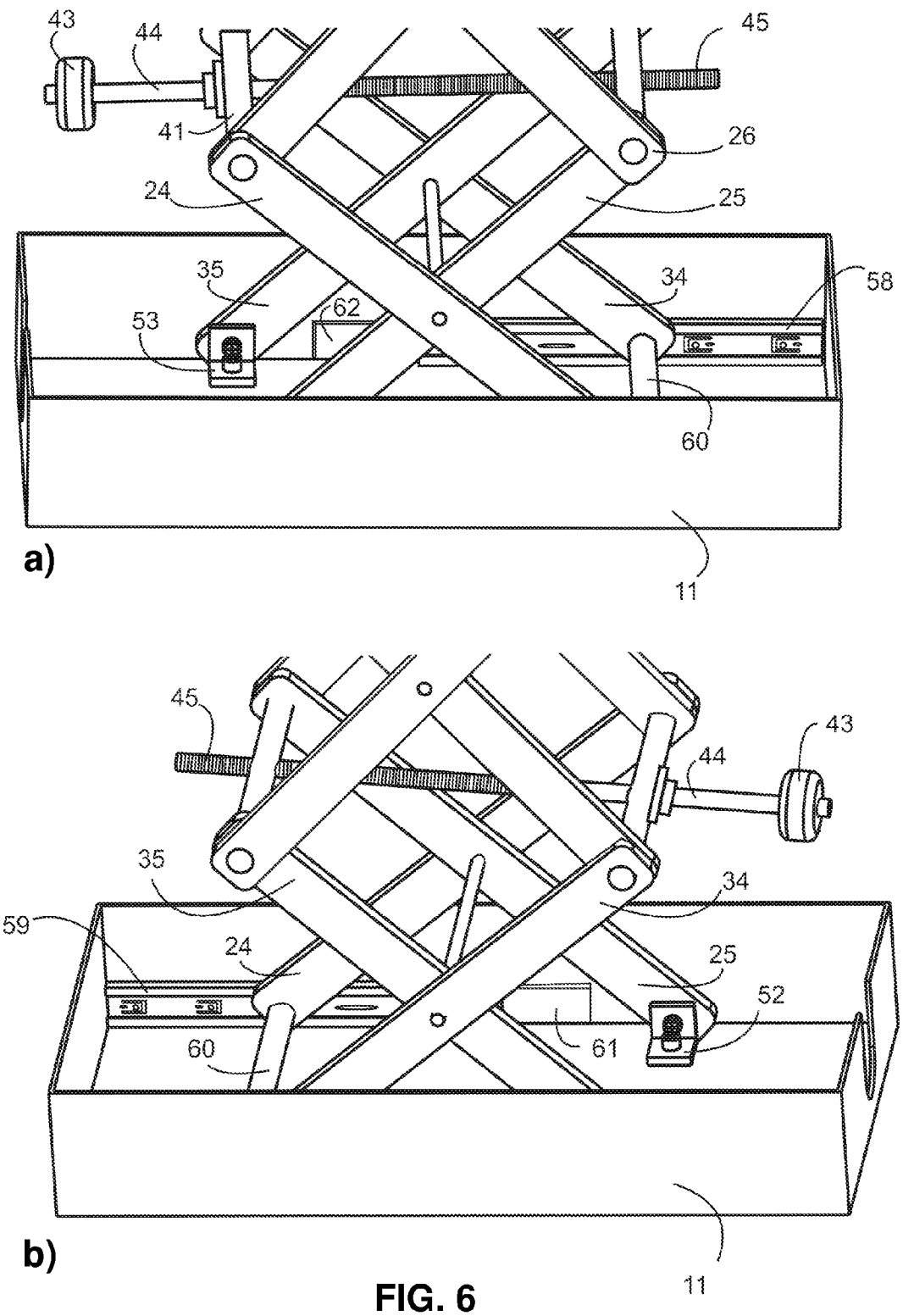
FIG. 6(a) is a perspective view of the base part of the present invention.
FIG. 6(b) is a perspective view of the base part of the present invention.

According to FIGS. 6(*a*) and 6(*b*) a pair of 3 channel rolling tracks 58, 59 are provided on two sidewalls 13, 15 of the base part 11 and extend from one end of the base 11 to its middle portion. The open sides of the tracks 58, 59 face each other. The end parts of the first arms 24, 34 in both scissor sets are pivotally connected to a shaft member 60.

According again to FIGS. 6(*a*) and 6(*b*), the 3 channel rolling tracks 58, 59 provided in the base part of the present installation device 10 is to enhance a smooth movement of the arms 24, 34 along the tracks 58,59 and cause to reduce the size of the jack assembly 21 to fit in the space between the base 11 and the cap 12 when the installation device 10 is in collapsed position.

Figure 7:
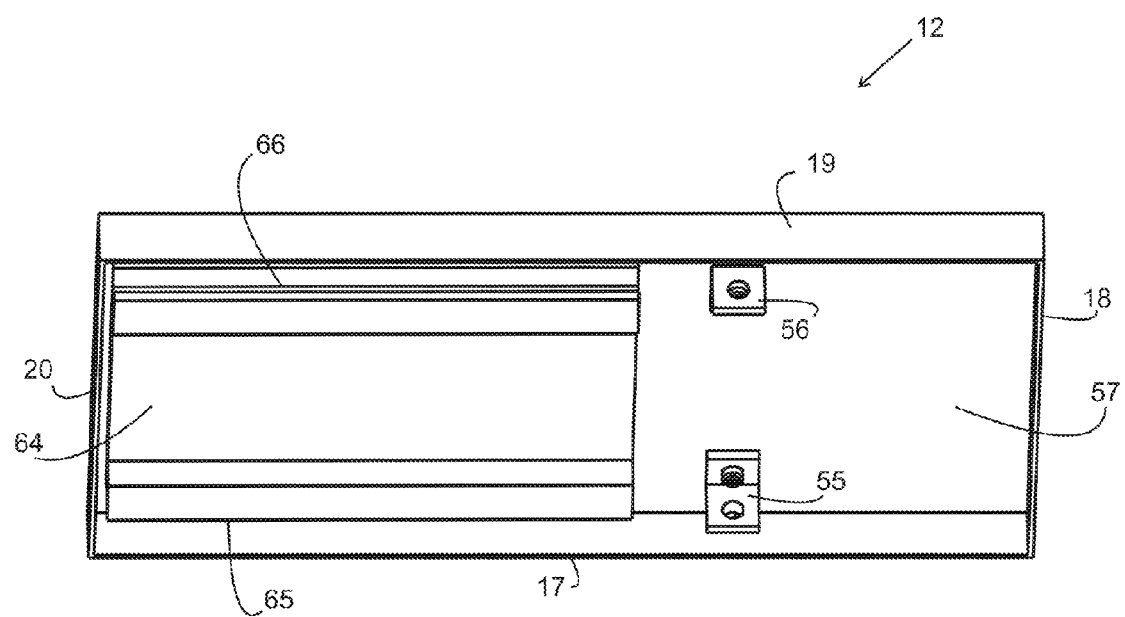
FIG. 7 is a perspective view of the cap part of the present invention.

FIG. 7 shows the cap part 12 of the installation device. A rectangular device 64 having a dimension to fit to two third of underside 57 of the cap 12 with the distance to the edges 17, 19, 20. Said device 64 has two C-shape rails 65, 66 mounted on its longitudinal edges thereon. The first rail 65 faces to the longitudinal edge 17 of the cap 12 and the second rail 66 face to the other longitudinal edge 19 of the cap 12.

The installation device 10 is designed for simultaneous operation for raising and holding the kitchen cabinets. The scissor columns are connected to each other by rod mechanism for raising and lowering the installation device 10. The jack assembly 21 is mounted in a rectangular box. Said box comprises of a base part 11 and a top cap 12. The top cap 12 is used for lifting and holding objects like kitchen cabinet in the present installation device 10 and is horizontally supported on the jack 21. Both bottom base 11 and top cap 12 features smooth bottom and top surface to prevent any damage to counter tops or cabinets.

As shown again in FIG. 4 a level 71 is inserted on top cap 12 of the installation device to maintain a thoroughgoing installation. The installation device is equipped furthermore with a height scale indicator 70 on the inner base part 11 of the box.

Figure 8:
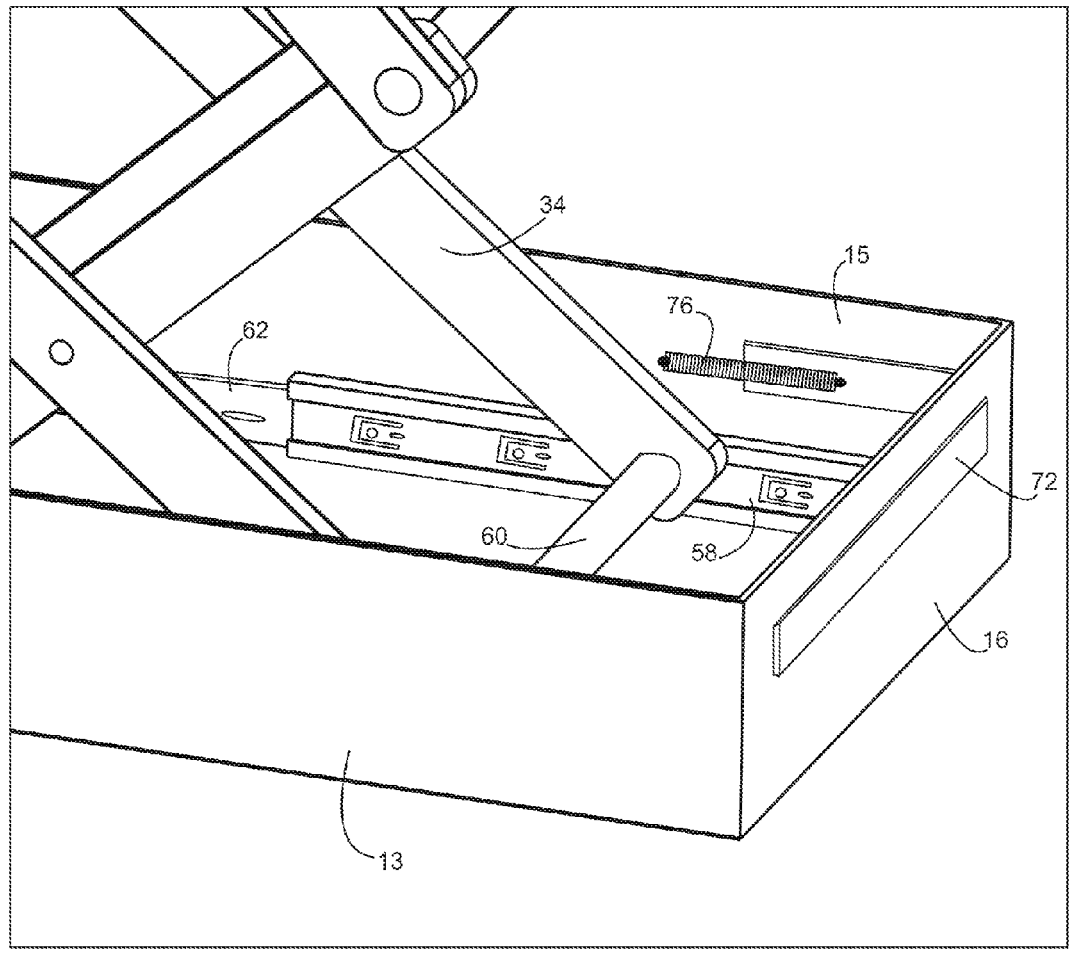
FIG. 8 is a perspective view of the retractable handle of the present invention.

According to FIG. 8 the installation device 10 includes a retractable handle 72, mounted on the side wall 16 of the base part for easily transportation of the device 10. Said handle having sleeves mounted on the inner part of the side walls 13 and 15. The retractable handle is movable through the openings on the sidewall 16. Said handle 72 is a pull out movable handle by a spring mechanism 76.

In cabinet installation procedure, the present installation device 10 is employed after the installation of the ground level cabinets. The cabinet lifting system is positioned on the top of the ground level cabinet; the wall cabinet to be installed is placed on the cabinet lifting system. The wall cabinet to be installed is then raised to the appropriate height on the wall, and held in place by the cabinet lifting device. After the wall cabinet is secured to the wall, the cabinet installation device is removed by turning the turning knob 43, thereby lowering the top cap. In this procedure a single installer can do the whole job, due to the size, light weighting and easy transportation. In work areas, where cabinets with higher lengths are being installed the installer is able to use two sets of the present installation device. The present installation device is ideal for installing special needs cabinets, handicapped kitchens due to its low profile under lower base cabinets and ideal for installation of floating or suspended base cabinets. By turning the turning knob the installation device raises to the desired height. The easy and micro turning knob enables to reach the exact height. The roller bearing mechanism provided in upper and lower rails creates a smooth glide and effortless lift action.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A kitchen cabinet installation jack in a box, comprising:
   a. a rectangular base having an inner surface, an outer surface, two parallel long sidewalls and two parallel short sidewalls;
   b. a pair of vertically extending scissor columns each having a bottom end adapted to engage with said base and an upper end adapted to be attached to a bottom surface of a top cap, wherein each of said scissor columns including at least one pair of arms which are pivotally movable relative to one another between a folded position and an unfolded position;
   c. a plurality of cross elements coupling said scissor columns together for cooperative vertical movement;
   d. a knob screw mechanism mechanically coupled with at least said two cross elements placed horizontally to each other for applying a force in a horizontal direction for unfolding the base part from the folded position to the unfolded position;
   e. a pair of 3-channel rolling tracks mounted on said long sidewalls of said base being engaged with said bottom end of said scissor columns, wherein said rolling tracks having a plurality of bearing for smooth movement of said arms;
   f. a pair of top-rails mounted on the bottom surface of said top cap being engaged with said upper end of said scissor columns, and
   g. said base and said top cap sized to fit and completely enclose said scissor columns and said cross elements in the folded position, thereby providing the jack in a box.

2. The kitchen installation device of claim 1, wherein said arms are rotatably joined to each other and form an X-shaped structure.

3. The kitchen installation device of claim 1, wherein said knob screw mechanism comprising of a rotatable lead screw with threads extended from one end and being engaged with a pair of shafts, said shafts connect middle portion of said scissor columns.

4. The kitchen installation device of claim 1, wherein said knob screw further having a micro turning knob on an unthreaded side and a hand turning, screwdriver insert and hex-head socket elements to turn the knob.

5. The kitchen installation device of claim 1, wherein said box further having a retractable spring handle on the side surface of said bottom base to enhance the transportation.

6. The kitchen installation device of claim 1, wherein said device further having a level placed on said top cap.

7. The kitchen installation device of claim 1, wherein said device further having a height scale indicator placed in said base part.

* * * * *